United States Patent [19]

Karim et al.

[11] 4,414,053
[45] Nov. 8, 1983

[54] POLYMER BLENDS AND EASY-PEEL FILMS PREPARED THEREFROM

[75] Inventors: Khalid A. Karim; James H. Rea, both of Houston, Tex.

[73] Assignee: Gulf Oil Corporation, Pittsburgh, Pa.

[21] Appl. No.: 447,230

[22] Filed: Dec. 6, 1982

[51] Int. Cl.³ .................. C08L 33/04; C08L 23/08
[52] U.S. Cl. ........................ 156/308.2; 156/327; 525/228
[58] Field of Search .............. 525/228; 156/308.2

[56] References Cited

U.S. PATENT DOCUMENTS 3,350,372 10/1967 Anspon et al. ................ 525/227

FOREIGN PATENT DOCUMENTS 1199958 7/1970 United Kingdom ............ 525/305

Primary Examiner—Carman J. Seccuro
Attorney, Agent, or Firm—Deane E. Keith; Forrest D. Stine; Richard C. Gaffney

[57] ABSTRACT

A polymer composition is disclosed and consists essentially of 100 parts by weight of an ethylene-alkyl acrylate copolymer and about 1 to 5 parts by weight of a polymer of a higher alkyl ester of acrylic or methacrylic acid. The polymer compositions have a lower heat seal strength than the ethylene-alkyl acrylate copolymer contained therein.

8 Claims, No Drawings 4,414,053

POLYMER BLENDS AND EASY-PEEL FILMS PREPARED THEREFROM

BACKGROUND OF THE INVENTION

In the preparation of heat sealed packages fabricated from polymer films, e.g., potato chip packages, the manufacturer wishes to have a package that is easily heat sealed. The customer wishes to have a package that can be easily opened by pulling the seal apart. Unfortunately, few if any polymer compositions have this desirable combination of properties.

SUMMARY OF THE INVENTION

The applicants have discovered that films prepared from blends of ethylene-alkyl acrylate copolymers with minor quantities of certain polymers of higher alkyl acrylates and methacrylates seal easily and the resulting seals have adequate but modest seal strengths of the order of 2.0 to 3.0 lb/inch. Seals of this strength can be easily pulled open by hand.

DETAILED DESCRIPTION OF THE INVENTION

The polymer compositions of the invention consist essentially of 100 parts by weight of the ethylene-alkyl acrylate copolymer and from about 1 to 5 and preferably about 1.5 to 4 parts by weight of the polymer of the higher alkyl acrylate. The polymer compositions can be prepared by any of the common techniques employed in the art to disperse one polymer into another. This conventionally is done by malaxating the materials on a two-roll rubber mill, or in a Banbury mixer, or by passing the mixture through a compounding extruder, or by other like techniques.

The ethylene copolymers included in the blends have polymerized therein about 70 to 98, preferably about 78–83, and more especially about 80 weight % of ethylene, with the balance of the copolymer being an alkyl ester of acrylic or methacrylic acid. The alkyl group of the acrylic or methacrylic acid ester may contain from about 1 to 18 carbon atoms, with the preferred esters being the methyl and the ethyl esters. Such copolymers can be prepared by known methods as disclosed, for example in U.S. Pat. No. 3,350,372, the disclosure of which is incorporated herein by reference.

The polymer of the higher alkyl acrylate or methacrylate preferably will be a homopolymer of an alkyl acrylate or alkyl methacrylate in which the alkyl group contains from about 8 to 24 carbon atoms and preferably from about 12 to 18 carbon atoms. Alternatively, it is possible to employ a copolymer of such an alkyl acrylate or methacrylate with ethylene provided that the copolymer contains a minimum of at least 25 weight % of the alkyl acrylate or alkyl methacrylate moiety. The molecular weight of the acrylate or methacrylate polymer should be sufficiently high so that the polymer is a solid at room temperature.

All of the polymer compositions employed in the work subsequently reported were prepared by adding the two polymer components to a Brabender Plasticorder operated at approximately 130° C. and 40 rpm. The mixing time was 20 minutes in all cases. Films of each blend having a range of thickness of 2–4 mils were compression-molded in a press.

The films were cut into 1"×2" strips and heat-sealed over a range of temperatures from 260° F. to 360° F. To minimize errors and improve reproducibility, a set of at least three films were sealed at each temperature. The seal strength at each temperature was measured by pulling the samples to the break point in an Instron Tester.

The following examples are set forth to illustrate more clearly the principle and practice of the invention to those skilled in the art. Where parts or percentages are mentioned, they are parts or percentages on a weight basis unless otherwise noted.

EXAMPLE 1

Part A

A polymer composition A was prepared by blending two parts of a homopolymer of octadecyl acrylate with 100 parts by weight of a copolymer containing 80 weight % ethylene and 20 weight % methyl acrylate. The homopolymer of octadecyl acrylate had a molecular weight of approximately 148,000. A polymer composition B was prepared in the identical manner, employing two parts of weight of a homopolymer of lauryl methacrylate. The lauryl methacrylate homopolymer had a molecular weight of approximately 70,000. A polymer composition C was prepared in the identical manner, employing two parts by weight of a homopolymer of hexadecyl methacrylate having a Tg value of 15° C. A polymer composition D was prepared in the identical manner employing two parts by weight of a homopolymer of octadecyl methacrylate which had a molecular weight of approximately 671,000. The films prepared from each of the above-described polymer compositions were indistinguishable in appearance from a film prepared entirely from the ethylene-methyl acrylate copolymer.

Part B

Films prepared from the four polymer compositions described in Part A were heat sealed over the temperature range previously discussed. The seal strengths of the bonds obtained ranged from approximately 2.3 lb/in. for polymer composition D to seal strengths of approximately 2.8 lb/in. for polymer compositions A, B, and C. These seal strengths were significantly lower than the seal strength of the bond prepared from films of the ethylene-methyl acrylate copolymer which had a seal strength of approximately 4.0 lb/in. The seal strength did not appear to be sensitive to sealing temperature over the range studied.

In addition to being useful in the direct manufacture of film, the polymer composition of the invention can be used as one component in the manufacture of the multilayered coextruded film. Usually the polymer blend will be employed as a surface component to take advantage of its heat sealing characteristics.

What is claimed:

1. A polymer composition consisting essentially of:
   (a) 100 parts by weight of an ethylene copolymer, and
   (b) About 1 to 5 parts by weight of a polymer of a higher alkyl ester of acrylic or methacrylic acid; said ethylene copolymer having polymerized therein about 70–98 weight % of ethylene and the balance an alkyl ester of acrylic or methacrylic acid; said polymer of a higher alkyl ester of acrylic or methacrylic acid being a homopolymer of said ester or a copolymer of said ester with ethylene in which the copolymer contains at least 25 weight % of said ester; the alkyl group of said ester containing about 8 to about 24 carbon atoms.

2. A composition of claim 1 containing about 1.5 to 4 parts by weight of the polymer of the higher alkyl ester of acrylic or methacrylic acid.

3. A composition of claim 1 in which the ethylene copolymer has polymerized therein about 78–83 weight % of ethylene and the balance methyl acrylate.

4. A composition of claim 2 in which the ethylene copolymer has polymerized therein about 78–83 weight % of ethylene and the balance methyl acrylate.

5. A method for lowering the seal strength of a film of an ethylene copolymer having polymerized therein
about 70 to 98 weight % of ethylene and the balance an alkyl ester of acrylic or methacrylic acid which consists essentially of uniformly dispersing about 1 to 5 parts by weight of a polymer of a higher alkyl ester of acrylic or methacrylic acid in 100 parts by weight of said ethylene copolymer;
said polymer of a higher alkyl ester of acrylic or methacrylic acid being a homopolymer of said ester or a copolymer of said ester with ethylene in which the copolymer contains at least 25 weight % of said ester; the alkyl group of said ester containing about 8 to about 24 carbon atoms.

6. The method of claim 5 in which the ethylene copolymer has polymerized therein about 78–83 weight % of ethylene and the balance methyl acrylate.

7. In a method for heat sealing two films of an ethylene copolymer having polymerized therein about 70 to 98 weight % of ethylene and the balance an alkyl ester of acrylic or methacrylic acid by heating an assembly of the two films under pressure; the improvement which comprises employing films consisting essentially of said ethylene copolymer having uniformly dispersed therein about 1 to 5 parts by weight of a polymer of a higher alkyl ester of acrylic or methacrylic acid in 100 parts by weight of said ethylene copolymer, whereby the heat seal strength of said film is lowered; said polymer of a higher alkyl ester of acrylic or methacrylic acid being a homopolymer of said ester or a copolymer of said ester with ethylene in which the copolymer contains at least 25 weight % of said ester; the alkyl group of said ester containing about 8 to about 24 carbon atoms.

8. The method of claim 7 in which the ethylene copolymer has polymerized therein about 78–83 weight % of ethylene and the balance methyl acrylate.

* * * * *